(12) United States Patent
Coddington

(10) Patent No.: US 11,378,693 B2
(45) Date of Patent: Jul. 5, 2022

(54) FLOOR SURVEYING SYSTEM

(71) Applicant: Timothy Coddington, Huntsville, AL (US)

(72) Inventor: Timothy Coddington, Huntsville, AL (US)

(*) Notice: Subject to any disclaimer, the term of this patent is extended or adjusted under 35 U.S.C. 154(b) by 573 days.

(21) Appl. No.: 15/984,345

(22) Filed: May 19, 2018

(65) Prior Publication Data
US 2018/0335521 A1 Nov. 22, 2018

Related U.S. Application Data

(60) Provisional application No. 62/509,164, filed on May 21, 2017.

(51) Int. Cl.
| | | |
|---|---|---|
| *G01S 17/89* | (2020.01) | |
| *G01S 7/481* | (2006.01) | |
| *G01S 17/42* | (2006.01) | |
| *G01S 7/48* | (2006.01) | |
| *G01S 17/87* | (2020.01) | |
| *G01S 17/86* | (2020.01) | |
| *G01S 7/51* | (2006.01) | |

(52) U.S. Cl.
CPC ............ *G01S 17/89* (2013.01); *G01S 7/4808* (2013.01); *G01S 7/4817* (2013.01); *G01S 17/42* (2013.01); *G01S 17/86* (2020.01); *G01S 17/87* (2013.01); *G01S 7/51* (2013.01)

(58) Field of Classification Search
CPC .......... G01S 17/89; G01S 17/86; G01S 17/42
See application file for complete search history.

(56) References Cited

U.S. PATENT DOCUMENTS

| | | | |
|---|---|---|---|
| 6,917,893 B2 | 7/2005 | Dietsch et al. | |
| 10,380,749 B2* | 8/2019 | Wohlfeld | ................ G06T 7/55 |
| 2007/0251735 A1* | 11/2007 | Kakinuma | ........... B62K 11/007 |
| | | | 180/6.5 |
| 2008/0088623 A1 | 4/2008 | Bukpwski et al. | |
| 2013/0314688 A1 | 11/2013 | Likholyot | |
| 2014/0240690 A1* | 8/2014 | Newman | ................ G01S 17/87 |
| | | | 356/4.01 |
| 2015/0331111 A1* | 11/2015 | Newman | ................ G01S 17/58 |
| | | | 356/4.01 |

* cited by examiner

*Primary Examiner* — Eric L Bolda
(74) *Attorney, Agent, or Firm* — Tomas Friend

(57) ABSTRACT

A floor surveying comprises a self-contained mobile unit that performs simultaneous localization and mapping (SLAM) using wheel odometry data and data from a range finding laser device (RFLD), a digital camera, or both. Point cloud data for mapping is collected using a RFLD positioned near the floor and scanning in a plane perpendicular to the floor. 3D point cloud data representing the floor surface and surfaces in apposition to the floor are displayed and used to generate a floor map or floor plan.

6 Claims, 5 Drawing Sheets

US 11,378,693 B2

FLOOR SURVEYING SYSTEM

BACKGROUND OF THE INVENTION

Field of the Invention

The present invention relates to a floor surveying system that uses a range-finding laser device (RFLD) to generate point clouds and maps of floor surfaces that show the floor edges or boundaries at and around the level of the floor.

Description of Related Art

LIDAR mapping systems use data from range finding laser devices (RFLDs) to produce floor plans of buildings. The resulting floor plans have a wide variety of uses, including planning how rooms in a building will be furnished, how displays may be arranged in a show room, how to evacuate a building in the event of fire, and planning for the laying of floor coverings such as carpet. Precise location of the RFLD at each scan position is necessary to generate accurate floor plans. Because GPS signals are not available inside of buildings, the location of the RFLD during each scan determined using a simultaneous localization and mapping (SLAM) process that fuses data received from positional sensors using a Kalman filtering technique.

For example, U.S. Pat. No. 6,917,893 describes a spatial data collection apparatus that collects and correlates spatial data to generate floor plans of existing interior spaces. The apparatus includes a wheeled platform that carries a fixed RFLD scanning in a plane parallel to the floor, a computer, and positional sensors that generate positional data about the position of the platform. The apparatus collects spatial data as it is manually moved through an indoor space and stores spatial data until it is transferred to an external computer, which creates a graphical representation based on the spatial data. The RFLD is used to collect spatial data and is not used for SLAM. If 3D spatial data is desired, a second RFLD may be used, but no description of the placement or orientation of a second RFLD is provided. Data is not processed in real time and no point cloud data is displayed until the data is processed by an external computer.

U.S. Pat. No. 8,699,005 describes a stationary indoor surveying apparatus that constructs a floor plan of an indoor environment. The surveying apparatus has a 2D range finder that measures 2D data sets that are projected onto a horizontal plane and aligned to construct a map. Data from a calibrated optical imaging system is used to process the constructed map to create floor plans and images correlated with the floor plans. Images for the imaging system can be used to establish positions of walls, doors, and windows and for drawing floor plans where projected 2D map information is missing.

Existing technologies for capturing data and rendering a layout of a building interior are not designed to generate accurate maps of floors, including the boundaries of the floor at and near floor level. Much or most of the actual edges of the floor are normally not visible to existing systems because furniture such as desks, chairs, and/or displays obstruct the floor's edge from the laser scanner. Baseboards, thresholds, moulding, stairwells, steps, ramps, and utility fixtures such as ducts, drains, pipes, vents, air returns, and electrical outlets located in a floor and/or along the bases of walls and posts other structures are often found along floor boundaries but are frequently hidden from view and the line of sight of laser scanners. As a consequence, the maps generated by existing systems do not accurately show the boundaries of floors at and near floor level.

BRIEF SUMMARY OF THE INVENTION

The present invention fills an unrecognized need in the art for apparatus, systems, and methods that can quickly and inexpensively map floor surfaces including the boundaries of floors to generate maps for use in the planning for floor coverings. The precise locations of floor edges along baseboards, vents, outlets, pipes, drains, poles, posts, built-in fixtures, thresholds, steps, ramps, and other structures at floor level are useful for better planning of floor covering operations and floor treatment operations.

A floor surveying according to the invention comprises a self-contained mobil unit that performs simultaneous localization and mapping (SLAM) using wheel odometry data and data from a range finding laser device (RFLD) and/or a digital camera. Point cloud data for mapping is collected using a RFLD positioned near the floor and scanning in a plane perpendicular to the floor. 3D point cloud data representing the floor surface and surfaces in apposition to the floor are displayed and used to generate a floor map, floor plan, or floor model.

BRIEF DESCRIPTION OF THE DRAWINGS

The elements of the drawings are not necessarily to scale relative to each other, with emphasis placed instead upon clearly illustrating the principles of the disclosure. Like reference numerals designate corresponding parts throughout the several views of the drawings in which.

DETAILED DESCRIPTION OF THE INVENTION

Figure 1:
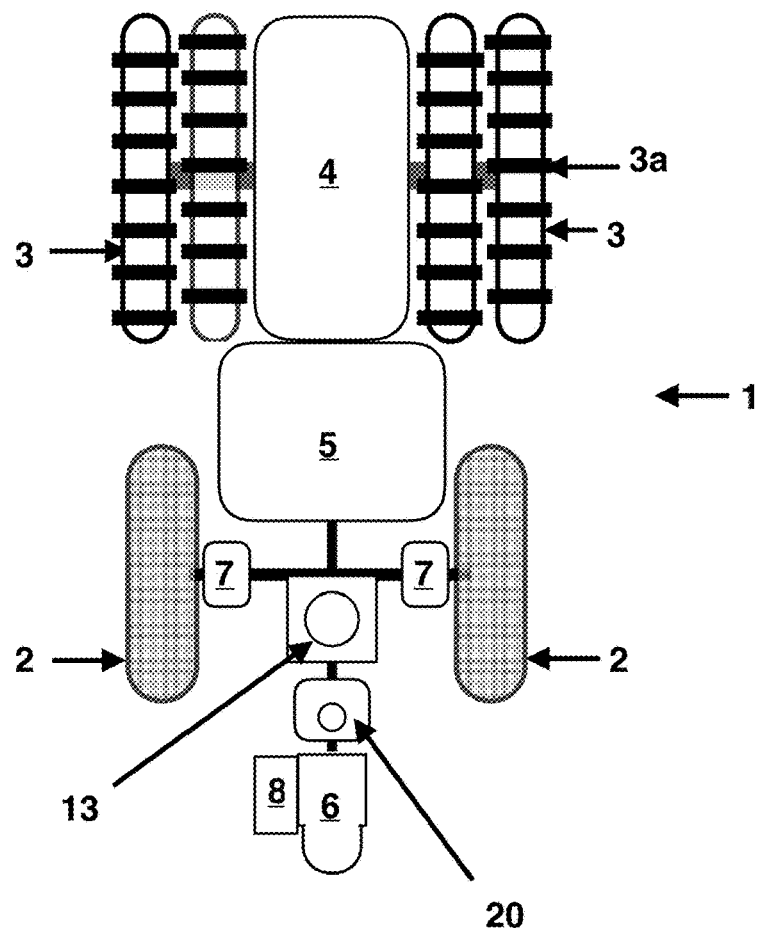
FIG. 1 is a top view of one embodiment of a floor surveying system.

All art specific terms used herein are intended to have their art-accepted meanings in the context of the description unless otherwise indicated. All non art specific terms are intended to have their plain language meaning in the context of the description unless otherwise indicated.

As used herein, an "omni wheel" refers to a wheel with discs around the circumference of the wheel which can rotate in a direction perpendicular to the turning direction of the wheel. The effect is that the wheel can turn as a normal wheel and can also move laterally on discs in a direction perpendicular to that of wheel rotation.

An incremental scan matcher pose is derived through a scan matching process, where successive laser scans are compared using a pattern matching or scan matching technique and the difference in orientation and position offset are computed. The difference is known as the change in pose, or incremental pose.

Real-Time (RT) refers to a method or process executed such that all of the steps proceed continuously and as data is input. There is no effective delay and input data is acted on immediately upon arrival to its logical conclusion or data in its final form. A delay of no more than one second between the collection of scan data and the display of the processed data in a point cloud is considered real time in the context of the present invention.

Registration refers to a process of rotating and translating an individual laser scan from a sensor frame of reference to a global frame of reference, which is a fixed frame of reference for the 2D or 3D inertial frame in which all points are represented. A global pose is used to transform (i.e. rotate and translate) laser scan Cartesian data in Sensor Frame into a global frame.

Sensor Frame of reference refers to the frame of reference in which a sensor measurement is read.

Pose refers to the position and attitude of a RFLD and includes pitch, roll, and yaw in addition spatial location in 3 dimensions.

Off-line refers to performing data processing without the use of a mobile unit, but instead using pre-recorded data.

On-line refers to performing data processing while using the mobile unit to collect data and in real-time. During on-line operation, data may be recorded and saved in files for later off-line processing.

Merged 3D Point Cloud in Global Frame refers to the result of merging all 3D Laser Scan Point Clouds in a Global Frame into one data set. All registered laser scans appear in one single data set representing scans within a time range.

Range-finding laser devices (RFLDs), such as those found in Light Detection and Ranging (LIDAR) systems are used to collect data points of three-dimensional position information, referred to as point cloud data. A point cloud is a set of data points in a particular coordinate system, normally expressed x,y coordinates for a 2-D point cloud or X, Y, Z coordinates for a 3-D point cloud. Point cloud data can be collected with a density sufficient to effectively re-create a scene much like a photograph. Robots equipped with LIDAR systems can be moved through an environment, such as the interior of a building, to collect point cloud data, which can be used to generate detailed images representing the environment through which the robot has moved. The images are normally shown using a global frame of reference, i.e. data collected at the different positions of the robot are translated to a single, common reference frame for generating a displayed image. Point cloud generation, and general LIDAR and RFLD operations are well known and therefore not further described herein.

The accuracy of point cloud data points in a global reference frame depends on the accuracy with which the position of the robot can be determined for each of the scans made by the RFLD as the robot moves through an environment. Simultaneous Localization and Mapping (SLAM) involves building, extending and improving a map of the surroundings of a moving robot and simultaneously determining the location of the robot with respect to the map. As a robot moves through a structure for which the robot has no defined map or known landmarks, a SLAM process is used to calculate the estimated position and orientation, or pose, of the robot from headings and positions based on data from sensors such as inertial sensors, wheel odometers, cameras, and RFLDs. SLAM systems typically involve a Kalman filter algorithm that fuses data from two or more of such sensors. SLAM techniques are well known in the art and are therefore not described herein in further detail.

Figure 2:
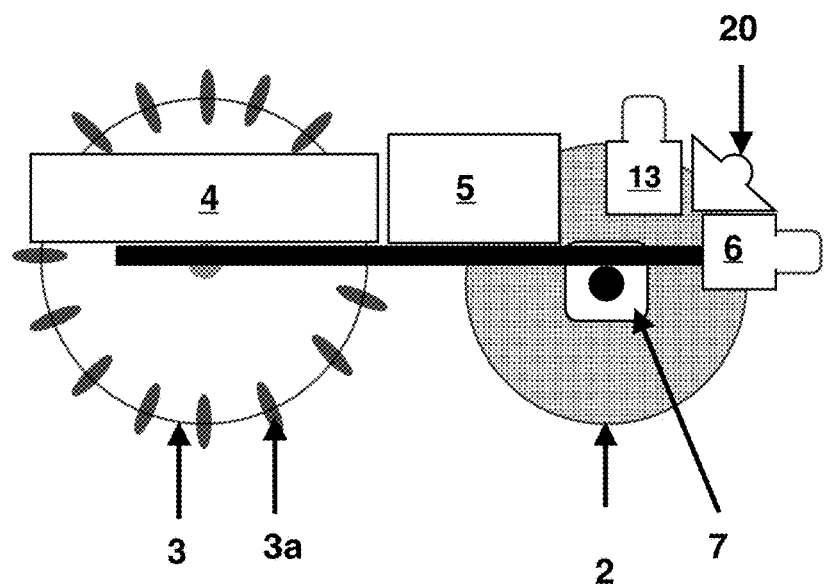
FIG. 2 is a side cross-sectional view of one embodiment of a floor surveying system.
Figure 3:
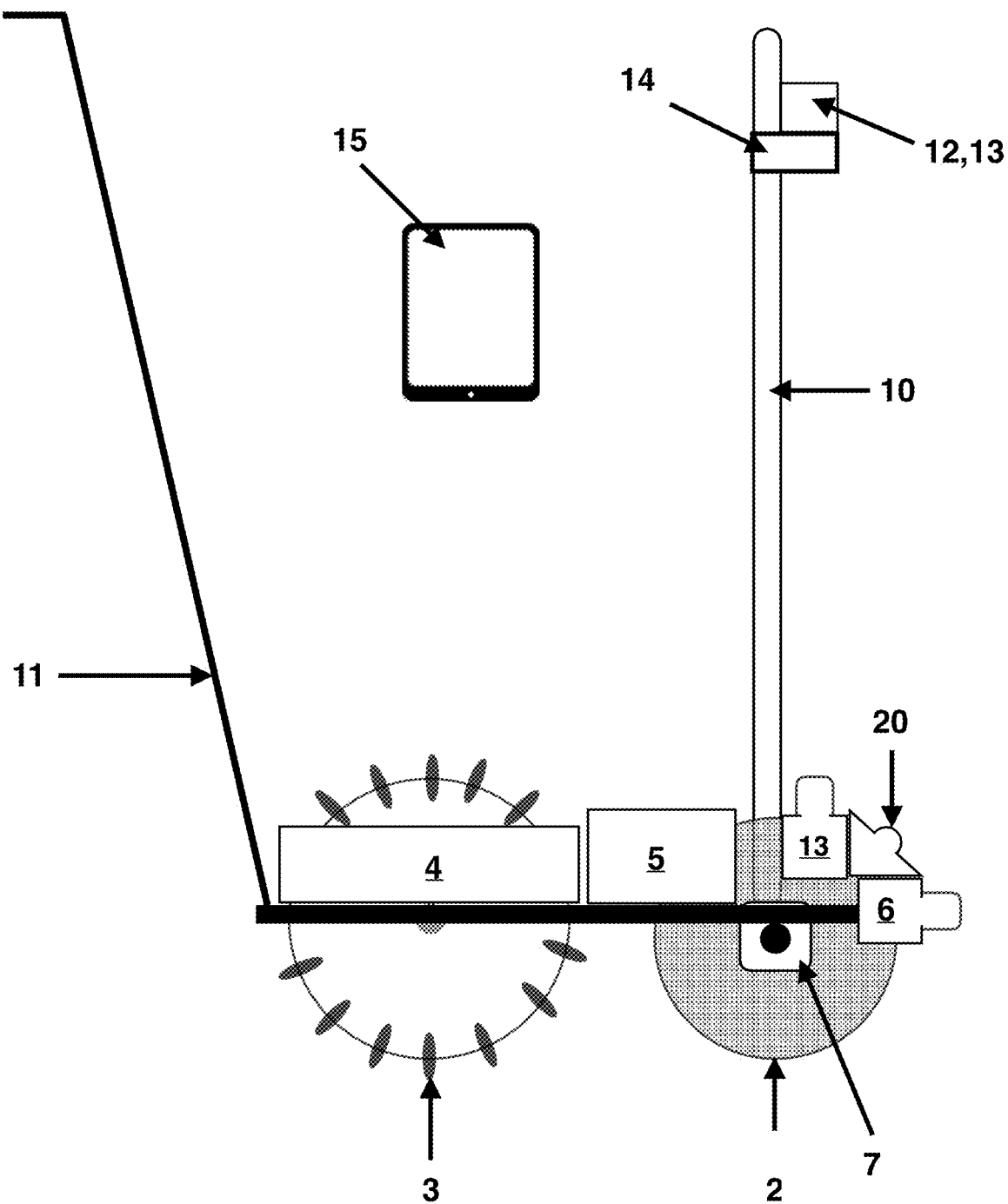
FIG. 3 is a side cross-sectional view of an embodiment of a floor surveying system with a handle.

A floor surveying system according to the present invention solves the problem of generating accurate maps of floor surfaces, including the boundaries, or edges, of the floor. The floor surveying system comprises a combination of technical features that allow the system to produce accurate 3-dimensional (3D) maps of floors in which the edges of floor surfaces are accurately identified. Edges of a floor surface may be found along baseboards, thresholds, built-in fixtures (e.g. cabinets, benches, and bookcases), pipes, ducts, vents, A floor surveying system according to the present invention comprises a mobile platform, examples of which are shown in FIGS. 1-3. The mobile platform (1) shown in FIG. 1 comprises two odometry wheels (2), each comprising an encoder that converts the angular position or motion of a shaft or axle of the wheel to an analog or digital code. The encoders track the movement of each odometry wheel in order to track the position and yaw of the platform. In a preferred embodiment, the encoder is a quadrature encoder. Other conductive, optical, or magnetic encoders may also be used.

The mobile platform (1) comprises at least one omni wheel (3). The embodiment shown in FIG. 1 comprise two pairs of omni wheels (3) with the wheels in each pair staggered so that at least one rotatable disc (3a) perpendicular to the wheel is positioned on the floor for minimal resistance to motion perpendicular to the omni wheel. One omni wheel is sufficient for platform stability and provides an advantage over wheels on rotatable spindles, such as casters, that may produce an unwanted movement as the spindle, which is not aligned with the center of the wheel, rotates. The mobile platform shown in FIG. 1 additionally comprises an inertial sensor or inertial measurement unit (IMU) (8) that measures the pitch, roll, and yaw of the platform (1) and therefore any component that is fixed to the platform (1). In another embodiment, the inertial sensor (8) may be positioned on, or integrated with, a component attached to the platform (1), such as a RFLD or a camera. In certain embodiments, no inertial sensor is required, as explained in more detail below.

A power supply (4) and computer (5) are mounted to the mobile platform (1) to provide power to and communications between components of the system. The computer (5) is operationally coupled to the odometry wheel(s) (2), the power supply (4), a first RFLD (6), and the inertial sensor (8), if present. The computer (5) may be a miniature desktop computer enabled for WiFi and Bluetooth® communications or any computing device capable of performing the required functions may be used.

The mobile platform comprises a first RFLD (6) positioned in proximity to the floor and oriented to scan in a plane that is perpendicular to the floor, preferably such that no portion of the mobile platform (1) intersects the scanning plane. The first RFLD shown in FIGS. 1-3 is positioned at the front of the platform approximately 4 cm from the floor with the scanning plane perpendicular to both the floor and the forward direction of the platform's movement. While such a configuration is preferred, this particular arrangement is not necessary as long as the scanning plane is essentially perpendicular to the floor. The center of rotation for the first RFLD is preferably positioned between 2 cm and 6 cm from the floor and the scanning plane is preferably, but need not be, perpendicular to the direction of the platform's forward motion. Scan data from the first RFLD is used for point cloud generation and is not used for SLAM to determine the pose of the mobile platform or the first RFLD.

To track the pose of the mobile unit/first RFLD and map its location in space, wheel odometry data is combined with data from at least one of a second RFLD (13) and a digital image capture device (12) (FIG. 3). The second RFLD and/or digital camera may be static or attached to a computer controlled moveable stage (14) (FIG. 3) that rotates and/or changes the pitch of the second RFLD (13). One or more of the image capture device (12) and second RFLD (13) may be fixed to the mobile platform (1) through a fixed connection or a moveable stage (14).

A display device and user interface (15) is preferably in the form of a laptop computer, tablet, or similar device communicating wirelessly with the computer (5). Alternatively, a combined interface and display may be reversibly affixed to the mobile (1) and connected to the computer (5) via cables. The display and user interface may also be embodied as separate devices communicating with the computer (5) wirelessly or via cables. The display device provides a rendering of a point cloud generated using data collected during operation. The user interface 3 allows an operator to provide input to the computer (5) to control the operation of the system. Point cloud data may be transmitted to and/or from computer (5) via a wireless network other suitable transfer method. The computer (5) may comprise additional imaging tools allowing a user to study, manipulate, and/or modify images generated from the point cloud.

During operation, the floor surveying system may further collect still or moving captured images via a camera (20). These images may be used in conjunction with the collected data to provide additional information about particular characteristics of floor and/or floor edge features detected during operation.

The mobile platform may move under its own power in accordance with user instructions using motors (7) attached to the odometry wheels (2) and powered by the power supply (4). Additionally or alternatively, the mobile platform may be moved manually by an operator using a handle (11) attached to the mobile platform. The mobile platform my comprise a mounting fixture (10) that rises above the base of the platform as shown in FIG. 3 to provide greater height for components mounted to the platform, such as a second RFLD (13) or image capture device (12). The mounting fixture (10) in FIG. 3 is shown as a straight member rising vertically above the platform (1) but may any of a number of shapes.

During operation, the system collects positional data for SLAM-based navigation in which the pose of the pose of the first RFLD (6) is determined for each scan (FIGS. 4-8). The pose of the first RFLD (6) and the scan data from the from the first RFLD (6) at each pose are used to generate point cloud data using a point cloud generator. Point cloud data from each scan is merged into a 3D point cloud in global frame of reference and displayed in real time as an updated point cloud after each scan. Point cloud data may additionally be stored for additional processing and displaying by the computer (5) and display (15) and/or transmitted to other devices for off-line processing and/or displaying.

Example: Odometry and Image Capture for SLAM

Figure 4:
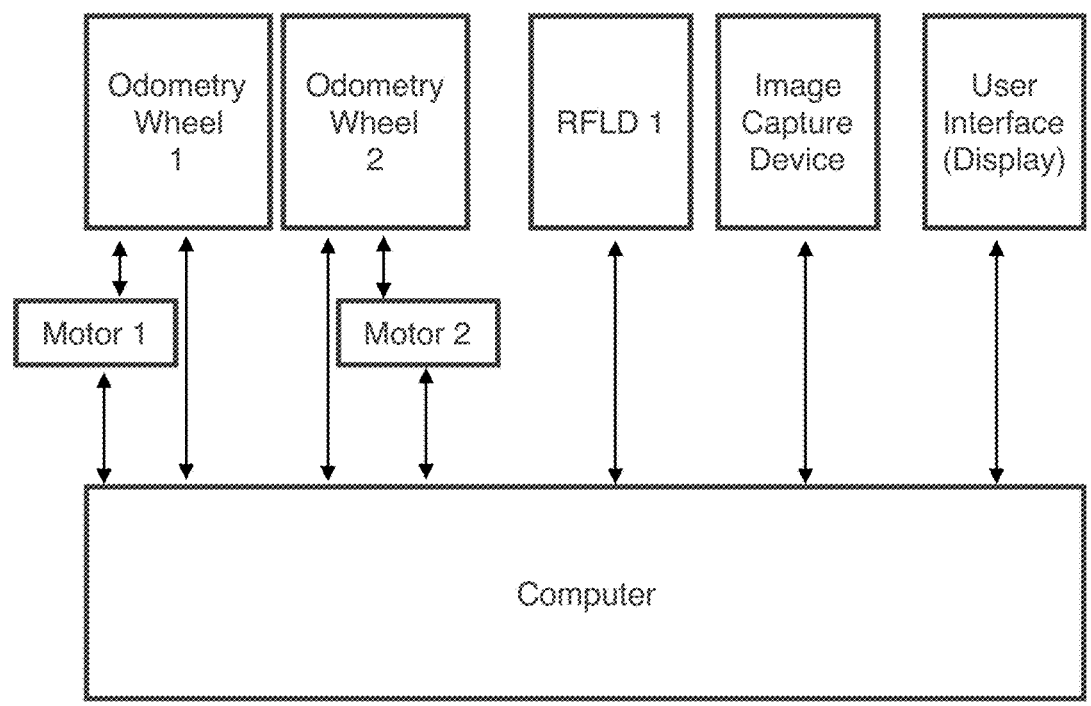
FIG. 4 is a diagram showing communications between components of an embodiment of a floor surveying system comprising an image capture device.
Figure 7:
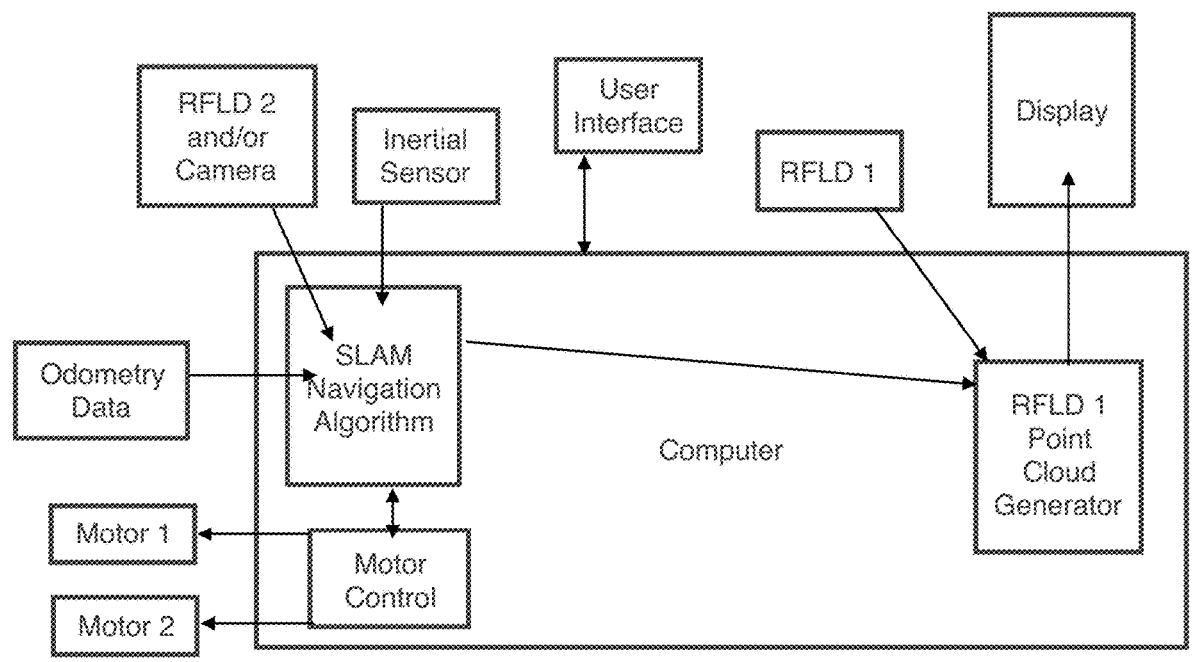
FIG. 7 is a diagram showing communications between components and navigation and point cloud generating subsystems in one embodiment.

Using a floor surveying system comprising a fixed digital RGB camera or other image capturing device, e.g. the embodiment shown in FIG. 3, odometry data from encoders on the odometry wheels (2) provides x and y coordinates and yaw of the mobile platform and components fixed to the platform, including the first RFLD (6) and image capture device (12). The image capture device (12) provides x,y,z, pitch, roll, yaw data for the camera (12), the platform and components fixed to the platform, including the first RFLD (6). The poses of the platform and other components including the camera (12) and first RFLD (6) are related by constant translations so that, if the mobile platform is known, the poses of components attached to the platform are also known and vice versa. The components communicate, for example, as shown in FIGS. 4 and 7. Positional data from the odometry wheel encoders and the image capture device (12) are fused using a known SLAM method to determine the current pose of the first RFLD (6). For each scan at each position of the mobile unit, the pose of the first RFLD (6) is used by a point cloud generator in the computer (5), to produce the most recent, cumulative point cloud in the global reference frame (FIG. 8), which is displayed on display device (15). The image capture device may be a digital camera, a stereo digital camera, or similar device.

Example: Odometry and a Fixed, Second RFLD for SLAM

Figure 5:
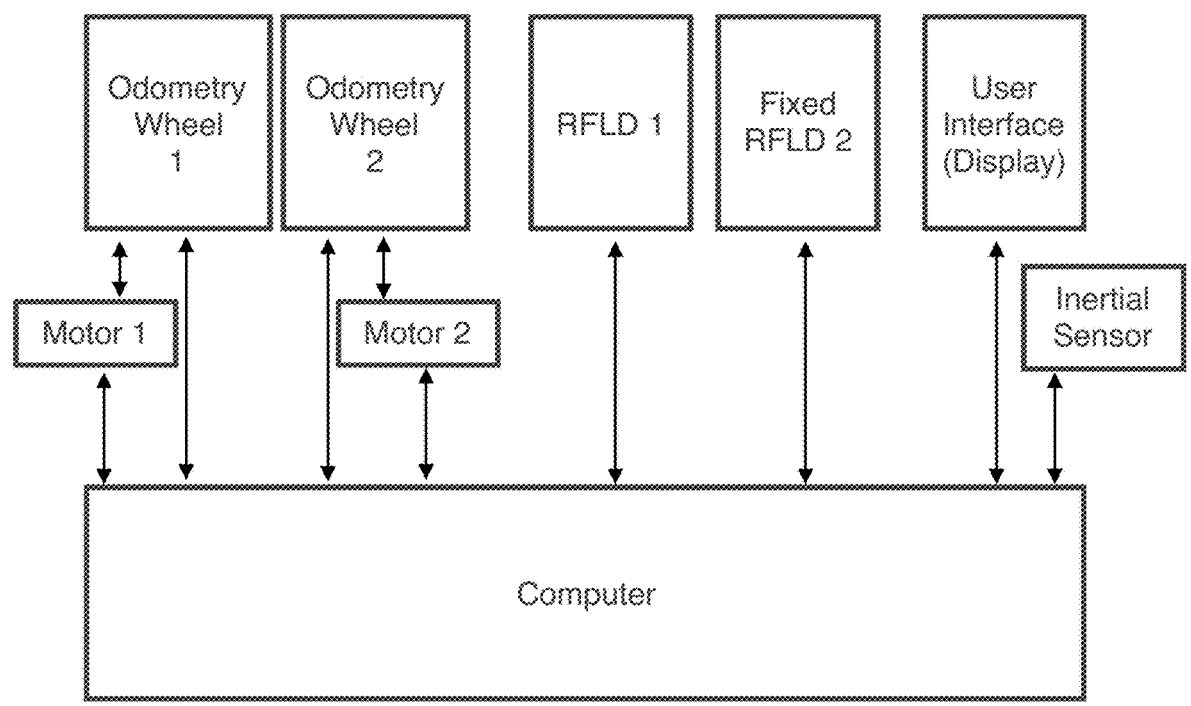
FIG. 5 is a diagram showing communications between components of an embodiment of a floor surveying system comprising a fixed second RFLD.

Using a floor surveying system comprising a fixed, second RFLD (13), e.g. an embodiment shown in one of FIGS. 1-3, odometry data from encoders on the odometry wheels (2) provides x and y coordinated and yaw of the mobile platform (1). The second RFLD (13) converts range data from horizontal scans to Cartesian coordinates to determine the x,y coordinates of the second RFLD (13) and/or the platform. Pitch, roll, and yaw data of the RFLDs are provided by the inertial sensor (8). The components communicate, for example, as shown in FIGS. 5 and 7. Positional data including x,y position and yaw from the encoders, the x,y position from the second RFLD (13), and pitch, roll, and yaw data from the inertial sensor (8) are fused in using a known SLAM method to determine the pose of the first RFLD (6). The pose of the first RFLD (6) is used for point cloud generation to produce the most recent, cumulative point cloud in the global reference frame (FIG. 8), which is displayed on display device (15).

Example: Odometry and a Moving Second RFLD for SLAM

Figure 6:
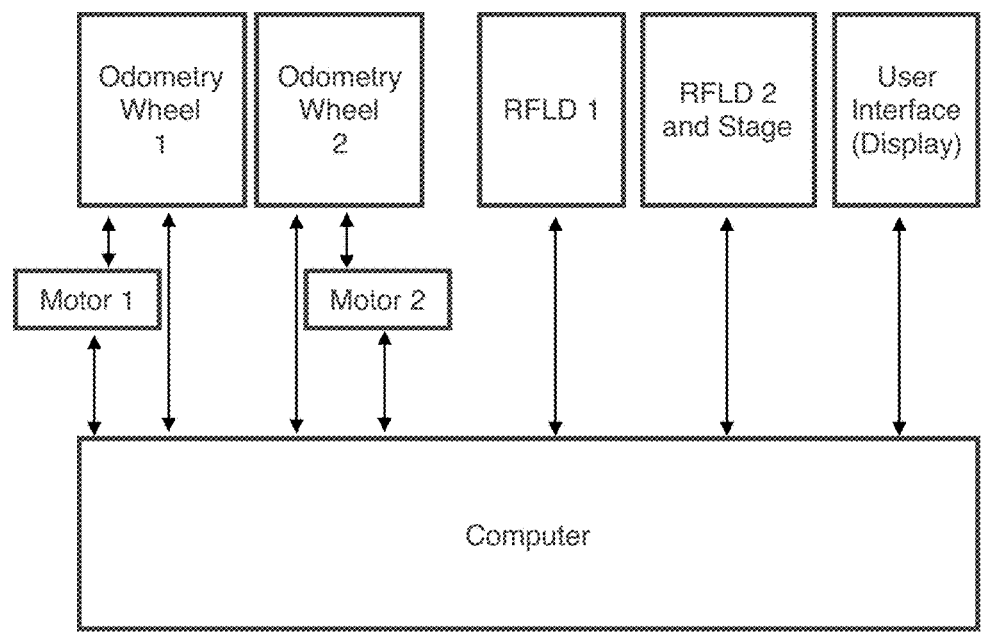
FIG. 6 is a diagram showing communications between components of an embodiment of a floor surveying system comprising a second RFLD on a movable stage.
Figure 8:
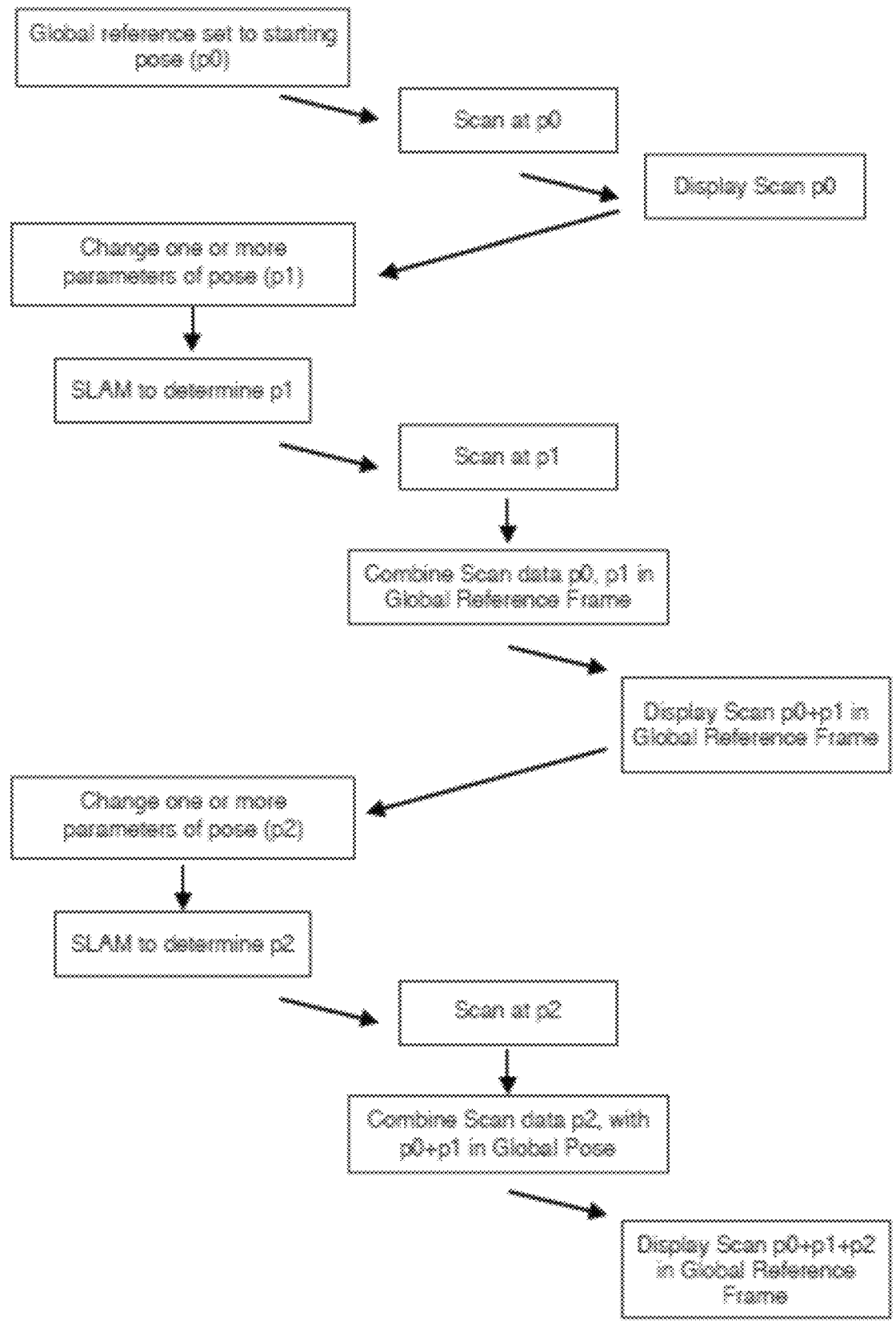
FIG. 8 is a flow chart of processes performed by the navigation and point cloud generating subsystems in one embodiment of a floor surveying system.

Using a floor surveying system comprising a fixed, second RFLD (13), e.g. the embodiment shown in FIG. 3, odometry data from encoders on the odometry wheels (2) provides x and y coordinates and yaw of the mobile platform and the second RFLD (13) and stage (14) provide x, y, z coordinates and pitch, roll, and yaw of the second RFLD (13). Because the stage is computer controlled, the pose of the second RFLD (13) with respect to the mobile platform is known for each scan. Multiple scans at a single x,y location may be used to generate 3D point cloud data at each position. 3D point clouds at successive x,y locations are used to estimate changes in pose from each x,y location to the next. using range data that is converted to Cartesian coordinates. The components communicate, for example, as shown in FIGS. 6 and 7. Positional data from the encoders and the second RFLD (12) are fused in a SLAM method to determine the pose of the platform (1) and the first RFLD (6). The pose of the first RFLD (6) is used in the point cloud generator, to produce the most recent, cumulative point cloud in the global reference frame for each scan at each pose (FIG. 8). In a preferred embodiment, the second RFLD (13) is mounted to the stage (14) with the scanning plane vertical (i.e. perpendicular to the floor) and the stage (14) rotates the second FRLD (13) around a vertical axis in the scanning plane. Alternatively, the second RFLD (13) may be mounted to the stage (14) with the scanning plane horizontal and the stage (14) changes the pitch of the second RFLD (13) around a horizontal axis in the scanning plane. In either case, the stage (14) is controlled by the computer (5), including degree of rotation or pitching, so angle of rotation or pitch are known and available as inputs for SLAM. An inertial sensor may be included in the system to provide additional pitch, roll, and/or yaw data to be included in the SLAM's sensor fusion process.

Embodiments of the invention may comprise a second RFLD (12) and an image capture device (12), for example a digital camera, that communicates with the computer such that images recorded by the camera are indexed to a position of the mobile platform. The movable stage (14) may be coupled to the computer (5), which executes an algorithm that controls the movement of the articulating mount and indexes a pose of the second RFLD (13) to data collected by the second RFLD.

The invention claimed is:

1. A mobile system for mapping the edges of a floor surface, said system comprising:
   a mobile platform comprising two parallel odometry wheels and an omni wheel, said odometry wheels each having a rotary encoder and configured to independently roll forward and backward;
   a first range-finding laser device (RFLD) affixed to the mobile platform such that a scanning plane of the RFLD is perpendicular to the floor and wherein said RFLD is positioned at a set distance from the floor and
   a second RFLD affixed to the mobile platform;
   an inertial sensor mounted to the platform, the first RFLD, or the second RFLD;
   a computer attached to the mobile platform and configured to receive data from the first RFLD, the second RFLD, and the rotary encoders,
   a power supply powering the RFLDs and the computer;
   an electric motor coupled to the odometry wheels and to a power supply; and
   a display device;
   wherein said computer comprises software that (a) uses a SLAM method to track the pose of the first RFLD using data from the rotary encoders, the second RFLD, and the inertial sensor; (b) generates a point cloud representing portions of the floor scanned by the first RFLD; and (c) sends point cloud data to the display device;
   wherein the display device receives point cloud data from the computer and displays a representation of portions of the floor scanned by the first RFLD; and
   the computer and the electric motor are coupled such that the movement of the wheels by the electric motor is controlled by the computer using data from at least one of the first RFLD, the second RFLD, and point cloud data.

2. The system of claim 1, wherein said first RFLD is positioned equidistant from each of the odometry wheels.

3. The system of claim 1, wherein the mobile platform further comprises a handle configured for an operator to move the mobile platform along a floor manually.

4. The system of claim 1, further comprising a mounting fixture that extends upward from the mobile platform and to which the second RFLD is mounted.

5. The system of claim 4, further comprising a camera and wherein said camera and said computer communicate such that images recorded by the camera are indexed to a position of the mobile platform.

6. The system of claim 1, wherein the display device is wirelessly coupled to said computer for receiving point cloud data and displays a map comprising scanned portions of the floor in real time.

* * * * *